United States Patent
Taylor et al.

[11] Patent Number: 6,090,503
[45] Date of Patent: *Jul. 18, 2000

[54] BODY IMPLANTED DEVICE WITH ELECTRICAL FEEDTHROUGH

[75] Inventors: William J. Taylor, Anoka; Joseph F. Lessar, Coon Rapids; Louis E. Halperin, St. Paul; Robert E. Kraska, Anoka, all of Minn.

[73] Assignee: Medtronic, Inc., Minneapolis, Minn.

[ * ] Notice: This patent is subject to a terminal disclaimer.

[21] Appl. No.: 09/061,402

[22] Filed: Apr. 16, 1998

Related U.S. Application Data

[63] Continuation of application No. 08/047,132, Apr. 9, 1993, which is a continuation-in-part of application No. 08/879,252, May 1, 1992, abandoned, which is a continuation-in-part of application No. 07/419,881, Oct. 11, 1989, abandoned.

[51] Int. Cl.[7] .................................................... H01M 2/08
[52] U.S. Cl. ........................................... 429/181; 429/185
[58] Field of Search ............................... 429/181; 174/50, 174/61

[56] References Cited

U.S. PATENT DOCUMENTS

| | | | |
|---|---|---|---|
| 4,180,700 | 12/1979 | Kraska et al. | 174/152 |
| 4,212,930 | 7/1980 | Athearn | 429/101 |
| 4,225,262 | 9/1980 | Keep et al. | 403/272 |
| 4,271,278 | 6/1981 | Phillips et al. | 525/356 |
| 4,292,346 | 9/1981 | Athearn | 427/115 |
| 4,307,162 | 12/1981 | Athearn | 429/121 |
| 4,421,947 | 12/1983 | Kyle | 174/152 |
| 4,556,613 | 12/1985 | Taylor et al. | 429/101 |
| 4,678,868 | 7/1987 | Kraska et al. | 174/152 GM |
| 5,015,530 | 5/1991 | Brow et al. | 428/433 |
| 5,021,307 | 6/1991 | Brow et al. | 429/184 |
| 5,821,011 | 10/1998 | Taylor et al. | 429/181 |

FOREIGN PATENT DOCUMENTS 0269007  11/1987  European Pat. Off. ......... A61N 1/36

OTHER PUBLICATIONS

Brow et al., Reactions and Bonding Between Glasses and Titanium, Sandia National Labs., Albuquerque, NM, Report No. Sand–87–0541C, Oct. 1987, DE88000603/XAB (Abstract).

Watkins et al., Chemical Abstracts: 108:115770s; 108:59384e, no month 1987.

Wetting of Ceramics by Liquid Metal. *Journal of The American Ceramic Society*, vol. 54, No. 7, pp. 332–334 (1971), relevant for kids discussion of wetting.

A memo dated Dec. 12, 1981 from Sandia National Laboratories relevant for its discussion of TA–23 glass. From B.C. Bunker 5841 and Carolyn Nelson, 5845.

A Sandia Report SAND83–2301/2 (1984) Entitled "Ampule Tests to Simulate Glass Corrosion in Ambient Temperature Lithium Batteries", relevant for its discussion of glasses and corrosion. by S.C. Douglas, B.C. Bunker, C.C. Crafts, R.K. Quinn.

*Primary Examiner*—Maria Nuzzolillo
*Assistant Examiner*—Mark Ruthkosky
*Attorney, Agent, or Firm*—Thomas F. Woods; Girma Wolde-Michael; Harold R. Patton

[57] ABSTRACT

A body implanted device including a container having an opening through which extends an electrical feedthrough. The feedthrough includes a terminal of bio-stable material. A glass insulator is positioned around the terminal. The glass insulator is chosen from a CABAL-12 type composition or variation thereof. The terminal is comprised of a material which has thermal expansion characteristics compatible with the glass seal. For glass seals having a thermal expansion in the range of 6.8 to $8.0 \times 10^{-6}$ in/in/° C. the terminal is comprised of a thin layer of titanium metallurgically clad over niobium or tantalum. For glass seals having a thermal expansion in the range of 8.0 to $9.0 \times 10^{-6}$ in/in/° C. the terminal is comprised of platinum, platinum-iridium or alloys of either, or of pure titanium.

18 Claims, 1 Drawing Sheet

BODY IMPLANTED DEVICE WITH ELECTRICAL FEEDTHROUGH

This application is a continuation application of U.S. patent application Ser. No. 08/047,132 filed Apr. 9, 1993 for "Body Implanted Device with Electrical Feedthrough" to Taylor et al., which is a continuation-in-part of now abandoned U.S. patent application Ser. No. 08/879,252 filed May 1, 1992 for "Body Implanted Device with Electrical Feedthrough" to Taylor et al. This is a continuation-in-part of U.S. patent application Ser. No. 07/879,252 filed May 1, 1992, which is a continuation-in-part of U.S. patent application Ser. No. 07/419,881 filed Oct. 11, 1989, now abandoned.

BACKGROUND OF THE INVENTION

Glass seals are used in various arrangements including batteries and other electro-chemical cells. For example, in battery headers, glass seals are used to seal the battery container while allowing one or more electrical terminals to extend through the seal for interior/exterior connection thereto. The term "feedthrough" shall be used herein to describe such arrangements in generic fashion.

In batteries and electrochemical cells, corrosion has been encountered. For example, batteries which include various organic electrolyte systems give rise to corrosion and cracking of glass and metal feedthrough components.

A special glass composition has been developed by Sandia National Laboratories which exhibits improved corrosion resistance. It is generally referred to as CABAL-12 glass. Although this glass has desirable corrosion resistance and resistance to cracking, it has been difficult to find metals which reliably wet the glass to form strong, hermetic seals with it and which work well with respect to the other aspects of seal forming such as weldability, expansion characteristics and so forth. Applicant's application Ser. No. 07/419,881 referenced above discloses a combination of metal and CABAL-12 glass which solves the problems relating to feedthrough structures in battery and electro-chemical cell applications.

Problems in addition to those referenced above are encountered where feedthroughs are utilized in connection with body implanted devices where the electrical terminals may come into contact with body fluids. In these applications it is necessary to choose terminals or pins made of bio-stable materials since there is the possibility of hydrogen embrittlement occurring, especially at the negative terminal in a direct current feedthrough application. The general purpose of this invention is to provide an improved body implanted device having an electrical feedthrough consisting of a combination of metal and CABAL-12 glass or variations of CABAL-12 glass.

SUMMARY OF THE INVENTION

This invention relates to medical devices implanted in the human body such as implanted pulse generators for neurological stimulation having electrical feedthrough structures. The body implanted device comprises a container with an opening between the interior and exterior of the container. An electrical terminal extends from the interior to the exterior through the opening in the container. The electrical terminal is chosen from bio-stable materials such as platinum or platinum-iridium alloys, pure titanium or titanium clad over tantalum or niobium to a thickness in the range of 50 to 300 microinches thereof. A glass insulator is positioned around a portion of the terminal in sealing engagement with the terminal and with the container. The glass insulator has a chemical composition consisting essentially of about 20 mole % $Al_2O_3$, about 20 mole % CaO, between about 0 mole % and 15 mole % $SiO_2$, between about 25 mole % and 40 mole % $B_2O_3$, between about 0 mole % and 20 mole % MgO, between about 0 mole % and 20 mole % BaO and between about 0 mole % and 10 mole % SrO.

In a further embodiment, the body implanted device further includes a sleeve or header attached to the container. The sleeve or header is positioned between the glass insulator and the container around a portion of the glass insulator and in sealing engagement therewith. The sleeve or header comprises titanium or a titanium alloy, preferably titanium alloy Ti—6Al—4V.

In one embodiment the electrical terminal is either platinum or a platinum-iridium alloy or pure titanium and the glass insulator has a chemical composition consisting essentially of about 20 mole % $Al_2O_3$, about 20 mole % CaO, between about 10 mole % $SiO_2$, about 30 mole % $B_2O_3$, between about 10 mole % and 20 mole % BaO and between about 0 mole % and 10 mole % SrO. In this embodiment, the thermal expansion of the glass insulator is between about 8.0 and $9.0 \times 10^{-6}$ inches per inch per degree centigrade.

In another embodiment the electrical terminal is comprised of a layer of titanium clad over tantalum or niobium and the glass insulator has a chemical composition consisting essentially of about 20 mole % $Al_2O_3$, about 20 mole % CaO, between about 0 mole % and 15 mole % $SiO_2$, between about 25 mole % and 40 mole % $B_2O_3$, and between about 0 mole % and 0 mole % BaO. In this embodiment, the thermal expansion of the glass insulator is between about 6.8 and $8.0 \times 10^{-6}$ in/in/° C.

DESCRIPTION OF THE PREFERRED EMBODIMENTS

Figure 1:
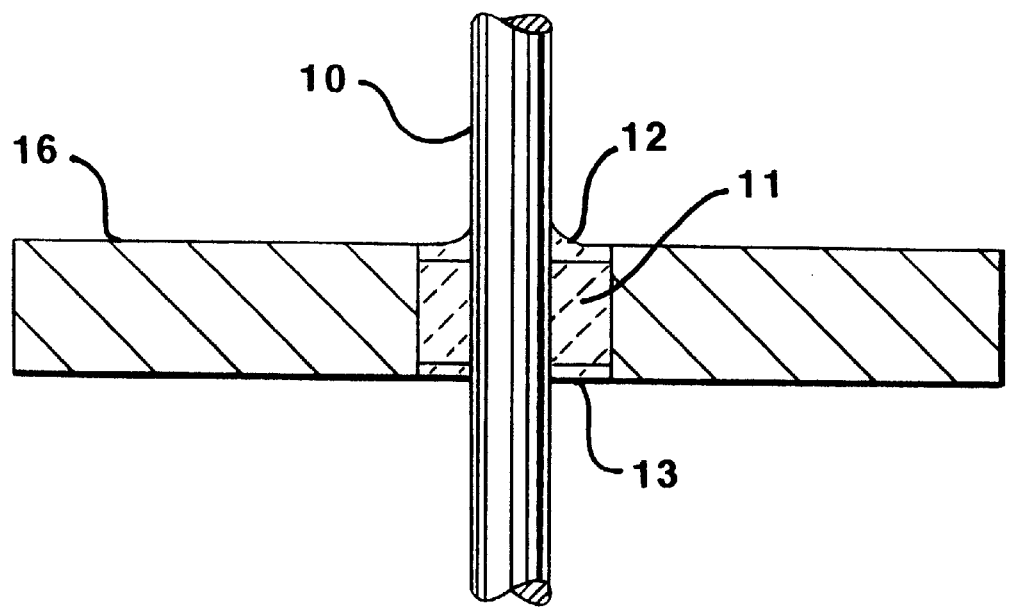
FIG. 1 is a schematic cross-section of a portion of a body implanted device with an electrical feedthrough in accordance with the invention.

While this invention may be embodied in many different forms, there are shown in the drawings and described in detail herein, specific preferred embodiments of the invention. The present disclosure is an exemplification of the principles of the invention and is not intended to limit the invention to the particular embodiments illustrated.

Referring to FIG. 1 a portion of a body implanted device with an electrical feedthrough is shown. The feedthrough includes a center pin or terminal 10, a glass seal member 11, and top and bottom end caps 12 and 13 respectively. In the arrangement of FIG. 1, the feedthrough is positioned such that top end cap 12 and bottom end cap 13 and glass seal member 11 extend through an opening in container 16. This arrangement and that of FIG. 2 wherein the feedthrough includes a sleeve or header 14 are typical feedthrough seal arrangements which may make use of the invention. Other arrangements may be used as well and may take any configuration in which the metal is wetted by the glass.

Figure 2:
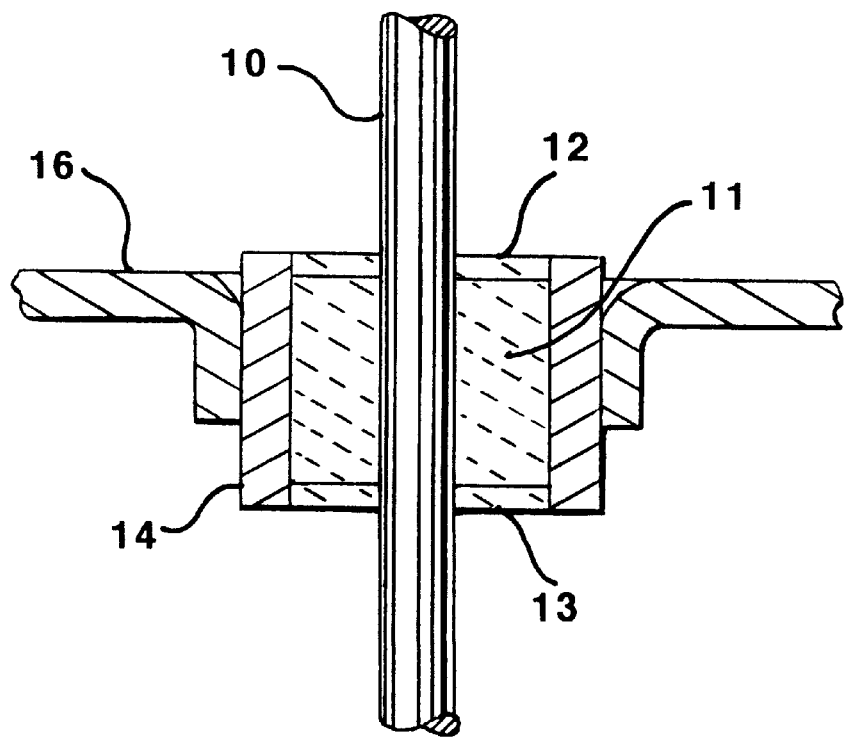
FIG. 2 is a schematic cross-section of a portion of a body implanted device with an electrical feedthrough having a sleeve according to an alternative embodiment of the invention hereof.

Referring now to FIG. 2, the invention in a preferred form is illustrated. The feedthrough includes a terminal 10 extending through a glass seal 11 bounded by top end cap 12, bottom end cap 13 and sleeve or header 14. In practice each body implanted device may have multiple feedthroughs. Sleeve 14 may be welded into an opening in the housing of the body implanted device such as container 16 of, for example, titanium or titanium alloy. During assembly, the feedthrough is placed in an oven or furnace and heated causing the glass seal member to wet the metallic components to form a hermetic seal between the glass and the metal components. Depending upon the chemical composition of the glass seal, forming weights may be required in order to ensure that the glass seal uniformly wets the surrounding metallic header and end caps. Bottom end cap 13 is utilized to contain the glass seal within the header and top end cap 12 is weighted with the forming weights to ensure uniform distribution of the glass seal and to prevent adherence of the sealing glass to the forming weights. After assembly the forming weights are removed and both top end cap 12 and bottom end cap 13 remain as part of the feedthrough assembly. End caps 12 and 13 are constructed of a high temperature glass or ceramic such as aluminum oxide ($Al_2O_3$) that meets the thermal expansion requirements of the glass seal member to which they are bonded.

Since electrical feedthroughs used in body implanted devices may inadvertently come into contact with body fluids, it is desirable that terminal 10 be made of a bio-stable material. For example, terminal 10 may consist of niobium, titanium, tantalum, platinum or a platinum-iridium alloy. However, the use of niobium, or tantalum or alloys thereof may be inappropriate because of their susceptibility to hydrogen embrittlement. This is especially true in direct current feedthroughs at the negative terminal where hydrogen embrittlement can occur as a result of the exposure of the terminal to body fluids. In such situations it is preferable to use platinum, platinum-iridium alloys, pure titanium or titanium metallurgically clad to a thickness of about 50 to 300 microinches over tantalum or niobium because they are less susceptible to hydrogen embrittlement. The particular material chosen is based upon its compatibility with the thermal expansion characteristics of the glass seal.

In general, for the application of this invention it is necessary that the terminal and the end caps have thermal expansion characteristics compatible with that of the glass seal. If the range of thermal expansion for the glass seal is from about 8.0 to about $9.0 \times 10^{-6}$ inches per inch per degree centigrade then the terminal or pin is comprised of platinum, platinum-iridium alloys or of pure titanium. If the composition of glass is such that its thermal expansion is in a range from about $6.8 \times 10^{-6}$ in/in/° C. to $8.0 \times 10^{-6}$ in/in/° C. then platinum or platinum-iridium alloys or titanium may not be acceptable as pins due to the large differences in thermal expansion of these metals with respect to the sealing glass. Here, titanium metallurgically clad over tantalum or niobium will act as an effective hydrogen barrier since the thermal expansion characteristics of the terminal will depend primarily on the base metal (tantalum or niobium) which is compatible with this thermal expansion range.

The following examples set forth the compatible materials which may be used in the construction of a body implanted device with an electrical feedthrough in accordance with this invention.

EXAMPLE 1

| | |
|---|---|
| Container | Titanium or a Titanium Alloy |
| Header or Sleeve | Titanium or a Titanium Alloy (preferably Ti-6Al4V) |
| End Caps | Aluminum Oxide ($Al_2O_3$) |
| Pin or Terminal | Titanium Clad Over Niobium or Tantalum |
| Glass Seal | CABAL-12 (Thermal Expansion approximately $6.8 \times 10^{-6}$ in/in/° C.) (concentration in mole % oxide) |
| $B_2O_3$ | 40.0 |
| $Al_2O_3$ | 20.0 |
| MgO | 20.0 |
| CaO | 20.0 |

EXAMPLE 2

| | |
|---|---|
| Container | Titanium or a Titanium Alloy |
| Header or Sleeve | Titanium or a Titanium Alloy (preferably Ti-6Al4V) |
| Bottom End Cap | Aluminum Oxide ($Al_2O_3$) |
| Pins or Terminals | Titanium, Clad Over Tantalum or Niobium |
| Glass Seal | CABAL-12 (Thermal Expansion approximately $7.5 \times 10^{-6}$ in/in/° C.) (chemical compostion in mole % oxide) |
| $SiO_2$ | 15.0 |
| $B_2O_3$ | 25.0 |
| $Al_2O_3$ | 20.0 |
| MgO | 20.0 |
| CaO | 20.0 |

EXAMPLE 3

| | |
|---|---|
| Container | Titanium or a Titanium Alloy |
| Header or Sleeve | Titanium or a Titanium Alloy (preferably Ti-6Al4V) |
| Bottom End Cap | Aluminum Oxide ($Al_2O_3$) |
| Pins or Terminals | Platinum, Platinum-iridium Alloys or Titanium |
| Glass Seal | CABAL-12 (Thermal Expansion approximately $9.0 \times 10^{-6}$ in/in/° C.) (chemical compostion in mole % oxide) |
| $SiO_2$ | 10.0 |
| $B_2O_3$ | 30.0 |
| $Al_2O_3$ | 20.0 |
| MgO | 20.0 |
| CaO | 20.0 |

EXAMPLE 4

| | |
|---|---|
| Container | Titanium or a Titanium Alloy |
| Header or Sleeve | Titanium or a Titanium Alloy (preferably Ti-6Al4V) |
| Bottom End Cap | Aluminum Oxide ($Al_2O_3$) |
| Pins or Terminals | Platinum, Platinum-iridium Alloys or Titanium |
| Glass Seal | CABAL-12 (Thermal Expansion approximately $8.2 \times 10^{-6}$ in/in/° C.) (chemical compostion in mole % oxide) |
| $SiO_2$ | 10.0 |

-continued

EXAMPLE 4

| | |
|---|---|
| $B_2O_3$ | 30.0 |
| $Al_2O_3$ | 20.0 |
| MgO | 20.0 |
| CaO | 20.0 |
| SrO | 10.0 |

In Example 1, the glass seal is comprised of CABAL-12 glass. CABAL-12 glass has thermal expansion characteristics compatible with terminals comprised of titanium clad over niobium or tantalum. Example 3 illustrates changes in the chemical composition of CABAL-12 glass which will make the glass seal more compatible with the use of terminals comprised of platinum or platinum-iridium alloys or titanium. As previously explained, although niobium, tantalum or niobium-titanium alloys may be used for the terminals, the use of titanium, titanium clad over tantalum or niobium, platinum or platinum-iridium alloys is preferred for use in body implanted devices where the terminals may inadvertently come into contact with body fluids. In Example 3, silicon dioxide and barium oxide are added to the CABAL-12 composition and magnesium oxide is removed. This will result in a glass having thermal expansion characteristics near that of platinum ($=9.0\times10^{-6}$ in/in/° C.).

In Examples 2 and 4 further variations in the composition of the glass seal are shown to illustrate the range of compositions from which the glass seal may be comprised in accordance with the present invention. Example 2 contains the same glass composition as Example 3 except that the amount of silicon dioxide ($SiO_2$) is increased from 10 mole % to 15 mole % and the amount of boron oxide ($B_2O_3$) is decreased from 30 mole % to 25 mole %. This will result in a glass composition with thermal expansion characteristics lower than the composition of Example 3. Likewise, the glass composition of Example 4 will result in a glass seal with thermal expansion characteristics greater than that of Examples 1 and 2 but less than the glass composition of Example 3. Example 4 has the same glass composition as Example 3 except that the amount of barium oxide (BaO) is reduced by 10 mole % and 10 mole % of strontium oxide (SrO) is added.

Examples 1 and 2 illustrate glass seals within the range of $6.8\times10^{-6}$ in/in/° C. and $8.0\times10^{-6}$ in/in/° C. In this range the glass seal is compatible with the use of terminals comprised of a thin layer (50–300 microinches) of titanium metallurgically clad over tantalum or niobium. The use of pure titanium, platinum or platinum- iridium is not desirable since these materials have thermal expansions which exceed that of the glass seal and are, therefore, not theoratically compatible.

Examples 3 and 4 illustrate glass seals within the range of $8.0\times10^{-6}$ in/in/° C. and $9.0\times10^{-6}$ in/in/° C. The higher thermal expansion characteristics of glass seals within this range are compatible with the use of terminals comprised of pure platinum or platinum-iridium alloys or of pure titanium.

An additional advantage is achieved by utilizing the glass seal compositions illustrated in Examples 2, 3 and 4. In those examples, the addition of silicon dioxide ($SiO_2$) will add to the fluidity of the glass composition thus eliminating the need for the use of mechanical weights to ensure uniform distribution of the glass seal. Since mechanical weighing is not necessary, the top end cap may be eliminated from the assembly. This will result in the elimination of one step in the assembly process and in the reduction of the costs of materials for the electrical feedthrough. Although any amount of silicon dioxide which is added to the standard CABAL-12 glass composition will improve the fluidity characteristics of the glass seal, the range illustrated in Examples 2, 3 and 4 of from about 10.0 mole % to about 15.0 mole % is preferred.

This completes the Description of the Preferred and Alternate Embodiments. Those skilled in the art may recognize other equivalents to the specific embodiments described herein, which equivalents are intended to be encompassed by the claims attached hereto.

Having described the invention, the exclusive rights and privileges thereto are to be defined by the foregoing claims in the light of the foregoing description.

What is claimed is:

1. A body implanted device comprising:
   a container having an opening between the exterior and interior of said container;
   an electrical terminal extending from the interior of said container through the opening in said container to the exterior of said container, said electrical terminal selected from the group consisting of platinum, platinum-iridium alloys, titanium or titanium clad over niobium or tantalum to a thickness in the range of 50 to 300 microinches; and
   a glass insulator positioned around a portion of said terminal in sealing engagement with said terminal and said container, said glass insulator having a chemical composition consisting essentially of about 20 mole % $Al_2O_3$, about 20 mole % CaO, between about 1 mole % and 15 mole % $SiO_2$, between about 25 mole % and 40 mole % $B_2O_3$, between about 0 mole % and 20 mole % MgO, between about 0 mole % and 20 mole % BaO and between about 0 mole % and 10 mole % SrO.

2. A body implanted device according to claim 1 further including a sleeve or header attached to said container, said sleeve or header positioned between said glass insulator and said container around a portion of said glass insulator for receiving same in sealing engagement therewith, said sleeve or header comprising titanium or a titanium alloy.

3. A body implanted device according to claim 2 wherein said sleeve or header is titanium alloy Ti—6Al—4V.

4. A body implanted device according to claim 1 wherein said electrical terminal is selected from the group consisting of platinum, platinum-iridium alloys or titanium and wherein said glass insulator has a chemical composition consisting essentially of about 20 mole % $Al_2O_3$, about 20 mole % CaO, about 10 mole % $SiO_2$, about 30 mole % $B_2O_3$, between about 10 mole % and 20 mole % BaO and between about 0 mole % and 10 mole % SrO.

5. A body implanted device according to claim 1 wherein said electrical terminal is selected from the group consisting of platinum or platinum-iridium alloys or titanium and wherein the range of chemical compositions of said glass insulator are chosen such that said glass insulator has a thermal expansion of between about 8.0 and $9.0\times10^{-6}$ inches per inch per degree centigrade.

6. A body implanted device according to claim 1 wherein said electrical terminal is comprised of titanium clad over niobium or tantalum and wherein said glass insulator has a chemical composition consisting essentially of about 20 mole % $Al_2O_3$, about 20 mole % CaO, between about 1 mole % and 15 mole % $SiO_2$, between about 25 mole % and 40 mole % $B_2O_3$, between about 0 mole % and 20 mole % MgO, between about 0 mole % and 20 mole % BaO.

7. A body implanted device according to claim 1 wherein said electrical terminal is comprised of titanium clad over niobium or tantalum and wherein the range of chemical compositions of said glass insulator are chosen such that said glass insulator has a thermal expansion of between about 6.8 and $8.0 \times 10^{-6}$ inches per inch per degree centigrade.

8. A body implanted device according to claim 1 further comprising a sleeve or header attached to said container, said sleeve or header positioned around a portion of said glass insulator for receiving same in sealing engagement therewith, said sleeve or header comprising titanium or a titanium alloy.

9. A body implanted device comprising:
a container having an opening between the exterior and interior of the container;
an electrical terminal extending from the interior of the container through the opening in the container to the exterior of the container, the electrical terminal consisting essentially of a material selected from the group consisting of platinum, platinum-iridium alloys, titanium, niobium, and tantalum; and
a glass insulator positioned around a portion of the terminal in sealing engagement with the terminal and the container, the glass insulator having a chemical composition consisting essentially of about 20 mole % $Al_2O_3$, about 20 mole % CaO, between about 10 mole % and about 15 mole % $SiO_2$, between about 25 mole % and about 40 mole % $B_2O_3$, between about 0 mole % and about 20 mole % MgO, between about 0 mole % and about 20 mole % BaO, and between about 0 mole % and about 10 mole % SrO.

10. A body implanted device according to claim 9, further comprising a sleeve or header attached to the container, the sleeve or header positioned between the glass insulator and the container around a portion of the glass insulator for receiving same in sealing engagement therewith, the sleeve or header comprising titanium or a titanium alloy.

11. A body implanted device according to claim 2, wherein the sleeve or header is titanium alloy Ti—6Al—4V.

12. A body implanted device according to claim 1, wherein the electrical terminal is selected from the group consisting of platinum, platinum-iridium alloys or titanium and wherein the glass insulator has a chemical composition consisting essentially of about 20 mole % $Al_2O_3$, about 20 mole % CaO, about 10 mole % $SiO_2$, about 30 mole % $B_2O_3$, between about 10 mole % and about 20 mole % BaO and between about 0 mole % and about 10 mole % SrO.

13. A body implanted device according to claim 1, wherein the electrical terminal is selected from the group consisting of platinum or platinum-iridium alloys or titanium and wherein the range of chemical compositions of the glass insulator are chosen such that the glass insulator has a thermal expansion of between about 8.0 and $9.0 \times 10^{-6}$ inches per inch per degree centigrade.

14. A body implanted device according to claim 1, wherein the electrical terminal is comprised of titanium clad over niobium or tantalum and wherein the glass insulator has a chemical composition consisting essentially of about 20 mole % $Al_2O_3$, about 20 mole % CaO, between about 1 mole % and about 15 mole % $SiO_2$, between about 25 mole % and about 40 mole % $B_2O_3$, about 20 mole % CaO, between about 0 mole % and about 20 mole % MgO, between about 0 mole % and about 20 mole % BaO.

15. A body implanted device according to claim 1, wherein the electrical terminal comprises titanium clad over niobium or tantalum and wherein the range of chemical compositions of the glass insulator are chosen such that the glass insulator has a thermal expansion of between about 6.8 and about $8.0 \times 10^{-6}$ inches per inch per degree centigrade.

16. A body implanted device according to claim 1, further comprising a sleeve or header attached to the container, the sleeve or header positioned around a portion of the glass insulator for receiving same in sealing engagement therewith, the sleeve or header comprising titanium or a titanium alloy.

17. The body implanted device according to claim 1, wherein an exterior surface of the glass insulator, the exterior of the container, the electrical terminal extending to the exterior of the container, and the exterior surface of the glass insulator are all subject to contact with body fluids.

18. The body implanted device according to claim 9, wherein an exterior surface of the glass insulator, the exterior of the container, the electrical terminal extending to the exterior of the container, and the exterior surface of the glass insulator are all subject to contact with body fluids.

* * * * *

UNITED STATES PATENT AND TRADEMARK OFFICE
CERTIFICATE OF CORRECTION

PATENT NO. : 6,090,503
DATED : July 18, 2000
INVENTOR(S) : Taylor et al.

Page 1 of 1

It is certified that error appears in the above-identified patent and that said Letters Patent is hereby corrected as shown below:

<u>Column 4,</u>
Line 27, Example 2: "CABAL-12" should read -- MG-1 --
Line 44, Example 3: "CABAL-12" should read -- MG-2 --
Line 62, Example 4: "CABAL-12" should read -- MG-3 --

Signed and Sealed this

Ninth Day of October, 2001

*Attest:*

*Attesting Officer*

NICHOLAS P. GODICI
*Acting Director of the United States Patent and Trademark Office*